United States Patent [19]

Colglazier et al.

[11] 4,455,018

[45] Jun. 19, 1984

[54] DOCUMENT FEEDER ELECTRONIC REGISTRATION GATE

[75] Inventors: Donald F. Colglazier, Longmont; Donovan M. Janssen; John P. Mantey, both of Boulder; James A. Valent, Longmont, all of Colo.

[73] Assignee: International Business Machines Corporation, Armonk, N.Y.

[21] Appl. No.: 262,727

[22] Filed: May 11, 1981

[51] Int. Cl.³ .............................................. B65H 9/20
[52] U.S. Cl. .................................. 271/227; 271/265; 271/DIG. 9; 355/35 H; 355/76
[58] Field of Search ............... 271/265, 275, 227, 228, 271/233, DIG. 9, 3.1; 355/3 SH, 14 SH, 75, 76

[56] References Cited

U.S. PATENT DOCUMENTS

| | | | |
|---|---|---|---|
| 3,741,357 | 6/1973 | Krysiuk et al. | 271/227 X |
| 3,843,915 | 10/1974 | Helmbold | 318/602 |
| 3,936,041 | 2/1976 | Shiina et al. | 271/265 X |
| 4,066,255 | 1/1978 | Bradbury | 271/265 |
| 4,176,945 | 12/1979 | Holzhauser et al. | 355/3 SH X |
| 4,179,215 | 12/1979 | Hage | 355/3 SH X |
| 4,184,673 | 1/1980 | Weisbach | 271/237 |
| 4,231,561 | 11/1980 | Kaneko et al. | 271/3.1 |
| 4,234,261 | 11/1980 | Hendrischk et al. | 400/621 |
| 4,243,316 | 1/1981 | Gustafson | 355/3 SH X |
| 4,345,751 | 8/1982 | Holzhauser | 271/233 X |

OTHER PUBLICATIONS

Mahler, C. J. "Document Feeder without Register Gates", *Xerox Disclosure Journal*, vol. 2, No. 3, May/-Jun. 1977, p. 49.

Taylor, T. N. "Document Registration System", *Xerox Disclosure Journal*, vol. 3, No. 2, Mar./Apr. 1978, pp. 123-125.

Gustafson, G. B. "Registration Mechanism" #18649, *Research Disclosure*, Oct. 1979, pp. 587-590.

European Patent Application 0 050 508 Filed Oct. 19, 1981, Published Apr. 28, 1982 Entitled "Original Feeder for Copying Machines" by P. DeSimone.

*Primary Examiner*—Bruce H. Stoner, Jr.
*Attorney, Agent, or Firm*—Joscelyn G. Cockburn; Earl C. Hancock

[57] ABSTRACT

A sheet registration apparatus for positioning sheets in a registered position on a work surface such as the document platen of a convenience copier/duplicator machine. The apparatus includes a bidirectional servo-controlled sheet transport for conveying the sheet over the work surface. A sheet sensing device is disposed within the path of sheet travel. A controller monitors the sensing device and activates a position control routine following the occurrence of a predetermined level change in the signal generated by the sensing device. At the end of the position control routine, the transport is stopped thereby positioning the sheet in the registration zone. The apparatus enables sheet registration for a machine operating in a duplex and/or simplex mode. The apparatus further enables registration at any point on the document platen.

3 Claims, 10 Drawing Figures

DOCUMENT FEEDER ELECTRONIC REGISTRATION GATE

BACKGROUND OF THE INVENTION

(1) Field of the Invention

This invention relates to sheet handling apparatus in general, and more specifically, the invention relates to an improved electronic sheet registration apparatus for registering original documents on the document platen of a copier/duplicator machine.

(2) Description of the Prior Art

The use of registration mechanism for registering document sheets on the document platen of a copier/duplicator machine is well known in the prior art. Prior art registration mechanisms may be manual or automatic.

In the manual type prior art devices, an operator places a document to be copied at the registration zone of the document platen. Usually, the registration zones are identified by indicia disposed along the sides of the document platen.

The automatic registration mechanisms usually coact with automatic document feeders (ADF) or semiautomatic document feeders (SADF) to position the document. U.S. Pat. No. 4,243,316 is an example of the prior art registration mechanisms. The registration mechanism is used to register sheets on the document platen of a copier/duplicator. A sheet feeder of the vacuum transport type is mounted by a hinge to the frame of the copier/duplicator. The sheet feeder is disposed above the document platen and is movable between an elevated position and a lowered position. When the feeder is in the elevated position, a document sheet can be manually placed against a registration mechanism to properly locate the sheet for exposure and copying. When the feeder is moved into a lowered position, a sheet from a hopper or tray in the top of the feeder is removed by the feeder and is advanced across the platen surface into engagement with the registration mechanism prior to exposure and copying.

The registration mechanism is of the mechanical type and consists of an elongated gate member or bar pivotally mounted to the frame of the copier/duplicator. The elongated gate runs transversely to the document platen and parallel to one edge of said platen. The elongated gate member has a first and a second surface that are disposed at an obtuse angle and meet along the edge. In one of its pivotal positions (called the lower position), the obtuse angle of the elongated gate member mates with the edge to register a sheet. In the other pivotal position (called the raised position), the elongated gate member is raised above the platen and sheets can be transported freely on the platen.

With the bar in the raised position, a sheet can be driven in a first direction past the registration mechanism, inverted and then returned to the platen so that the second side of the sheet can be copied. The procedure is often referred to as duplex copying.

Other types of prior art registration gates consist of a mechanical gate which descends or ascends into the path of the sheet to be registered. If the registration gate is mounted to the document feeder, it usually descends in a vertical orientation relative to the exposure platen and stops a sheet at the proper registration zone. Alternately, when the registration gate is mounted on the copier frame, it ascends upwardly to stop the sheet. As before, the gate is disposed vertically with respect to the document platen. Examples of the vertical type registration gates are disclosed in U.S. Pat. Nos. 4,176,945 and 4,179,215.

Yet another type of prior art registration mechanism is disclosed in an article entitled "Document Feeder without Registration Gate" by Charles J. Mahler and published in Volume 2, Number 3, May/June 1977 (pg. 49) of the *Xerox Disclosure Journal*. In the article, a document to be registered on the platen of a copier is preregistered against a pivotal stop. The document is then fed in a timed relation onto the platen. A segmented friction drive system controls a platen transport system so that the sheet is driven a given distance after preregistration.

Although the prior art mechanical gates work satisfactorily for its intended purpose, such registration mechanisms tend to be relatively slow and tend to damage the edge of the document. The edge damage to sheets is the result of the sheets impacting on the gate member. The damage increases as the speed with which the sheets are transported increases.

The slowness of the mechanical gates stem from the fact that there is a lag time between the issuance of a command to position and/or remove the gate from its registration position at the document glass. For high speed copiers it is necessary that a sheet be positioned and removed from the document platen in a relatively short period of time. As such, mechanical gates tend to reduce the throughput of the system and are not suitable for use in high performance machines. U.S. Pat. No. 4,066,255 is another type of prior art registration apparatus which does not require a gate for registering sheets on the document platen. The apparatus consists of a switch disposed between a sheet feeder and a platen transport mechanism. The sheet feeder delivers sheets in seriatim to the platen transport mechanism. As sheets are dispensed by the feeder, the sheets trip the switch. Tripping of the switch activates the platen transport and deactivates the feeder. The platen transport is controlled to transport the sheet a predetermined distance to the registration position.

Vol. 3, Number 2, March/April 1978 (pgs. 123-125) of the *Xerox Disclosure Journal* describes a document registration system in which the leading edge of a document is transported past a switch or photo-optical lead edge sensor. The switch or photo-optical sensor is disposed on the downstream side of a sheet platen registration zone in the direction of travel. The sheet is then reversed for a fixed short distance equal to the fixed distance between the sensor and the registration zone.

Admittedly, the latter nonmechanical registration devices are an improvement over the prior art mechanical registration devices. However, the prior art nonmechanical devices do suffer from a few drawbacks. By way of example, the prior art nonmechanical registration devices do not contemplate bidirectional registration of a sheet. As such, the prior art devices are not suitable for registering documents in a copier operating in a duplex mode. As was stated previously, duplex operation requires that both sides of the sheet must be copied. Similarly, the prior art nonmechanical registration devices require that the sensor be disposed at a fixed distance from the registration zone or line on the document platen. As such, once a registration zone is established relative to a sensor, it is almost impossible to register a document at any other point on the document platen. This drawback tends to unduly restrict the use of document feeders to position a sheet on the document platen. In fact, this limitation or defect is also a characteristic of the prior art mechanical gates.

SUMMARY OF THE INVENTION

It is therefore the object of the present invention to provide a sheet registration mechanism which is more efficient than has heretofore been possible.

It is another object of the present invention to provide a sheet registration mechanism which registers a sheet at any registration zone on the document exposure platen of a copier/duplicator.

It is yet another object of the present invention to provide an electronic registration mechanism which registers sheets bidirectionally to enable duplex and/or simplex copying.

In accordance with the present invention, the electronic registration mechanism includes a paper sensing device disposed relative to the exposure platen of a copier/duplicator. Preferably, the sensor is placed at the confluence of the simplex and duplex paper path of said copier/duplicator. A sheet handling device, preferably of the vacuum belt transparent type, is hingedly mounted to the frame of the copier/duplicator. The configuration is such that the sheet handling device is above the explosure platen. The sheet handling device is driven by a bidirectional servo motor. The motor is controlled by a closed loop servo system which includes a microcomputer. A document to be copied is transported in a first direction so that the leading edge of the document covers the sensor. The document is then transported in a second direction opposite to that of the first direction. The microcomputer monitors the sensor and as soon as the document's trailing edge clears the sensor, the microcomputer initiates an algorithmic routine resulting in the generation of control signals. The signals drive the motor so that the sheet handling device is transported at a controlled position trajectory so that the document is stopped at a predetermined registration zone.

The foregoing and other features and advantages of the invention will be apparent from the following more particular description of a preferred embodiment of the invention, as illustrated in the accompanying drawings.

DETAILED DESCRIPTION OF THE PREFERRED EMBODIMENT

Although the present invention can be used in any environment where it is necessary to position work pieces at a particular zone, it works well in registering documents on the exposure platen of a copier/duplicator. As such, the invention will be described in that environment. However, this should not be regarded as a limitation on the scope of the invention, since it is intended that the invention may be applicable to the general application of presenting work pieces at a particular registration zone rather than to be limited to any particular use. For brevity, conventional elements, such as support frame for the document handler, sheet stacking tray for the document handler, copier frame and copier operating components will be omitted. As such, only components which are necessary to the understanding of the present invention will be described in detail hereinafter.

Figure 1:
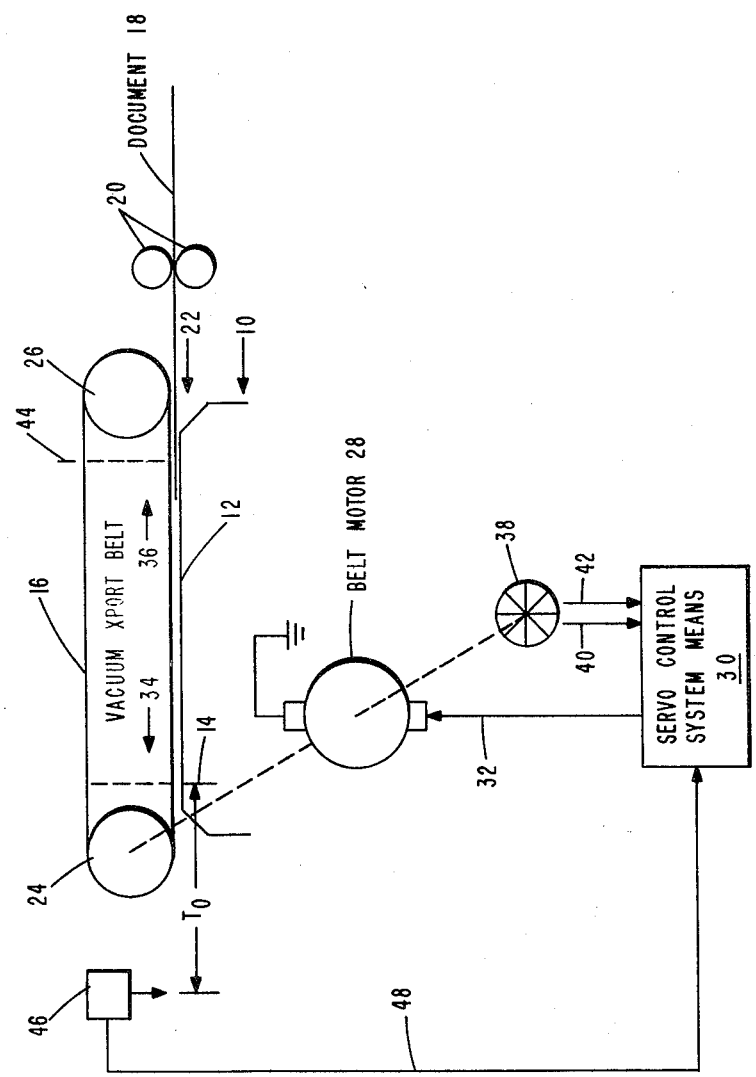
FIG. 1 shows a schematic of the electronic registration mechanism according to the teaching of the present invention.

Referring now to FIG. 1, a copier/duplicator system embodying an electronic registration paper gate according to the teaching of the present invention is shown. As stated before, conventional copier elements such as frames, etc. are omitted. The copier/duplicator system includes a copier or duplicator engine 10. The copier/duplicator engine is fitted with an exposure platen 12. As is known to those skilled in the art, the exposure platen 12 is transparent and is fitted with a registration zone identified in the drawing by numeral 14. Alternately, the registration zone may be placed at the location identified by numeral 44. Hereinafter the registration zone is referred to as the glass registration position. A document to be copied is positioned on the glass so that the leading edge of the document is in alignment with glass registration position 14. The document is then illuminated by the illumination system of the copier (not shown). As a result of the illumination, a latent or electrostatic image of the original document is formed on the photoconductive surface (not shown) of the copy. The electrostatic image is then transported to a plurality of processing stations where it is toned or developed and transferred to a supporting media. As stated before, all of these components and/or processing stations are well known, and therefore, are not shown in the drawings nor will be described in detail. Returning to FIG. 1, a recirculating automatic document feeder (RADF) 16 is coupled by a hinge (not shown) to the frame of the copier/duplicator 10. The RADF is usually fitted with a support tray in which original documents to be copied are loaded. A document 18 to be copied is removed from the tray and is delivered by transport means 20 to the transport section of RADF 16. The document is transported in the direction identified by numeral 22. Although a plurality of transport means can be used for transporting document 20 onto the document platen, in the preferred embodiment of this invention the transport means is a vacuum transport belt. The belt is disposed in a plane parallel and above the exposure platen 12. As is shown in FIG. 1, the document 18 appears to be detached from the undersurface of the vacuum transport belt (vacuum xport belt). However, in actuality, the transport means 20 delivers the document 18 to the transport belt so that the negative pressure associated with the belt attaches the document onto the undersurface. The transport belt is mounted over a vacuum plenum (not shown) and is supported by drive roller 24 and idler roller 26. The use of a vacuum belt disposed above the platen of a copier for transporting documents onto the document platen is well known in the art and details will not be shown or described hereinafter. By way of example, the above-described U.S. Pat. No. 4,243,316 describes a vacuum belt transport which could be used for transporting the sheet.

The drive roller 24 is coupled to the shaft of belt motor 28. In the preferred embodiment of the invention, the belt motor is a DC motor. The DC motor 28 is of the bidirectional servo-controlled type. As such, depending on the energization signal generated by servo-controlled system 30 on conductor 32, the belt can be transported bidirectionally in the directions identified by arrows 34 and 36, respectively. As such, a document 18 which is attached to the undersurface of vacuum transport belt can be positioned at any registration zone on the surface of the exposure platen 12.

A direction/position sensor 38 is coupled to the shaft of the DC motor. In the preferred embodiment of this invention, the direction/position sensor 38 is a two-phase conventional tachometer. The tachometer outputs pulses on conductors 40 and 42, respectively. The signals are processed by the servo-controlled system 30. The servo-controlled system generates signals on conductor 32 which are used to drive the DC motor 28. As is evident from the figure, the DC motor 28 is driven by a closed-loop servo.

It should be noted, at this point, that although the registration zone on the document platen is identified by numeral 14 or numeral 44, this should be regarded as exemplary only. As was stated before, the registration zone can be any point on the document platen. The registration zone need not be fixed, as in the prior art, but can be varied according to the need of the user. This invention enables the user to position and/or register the paper at any point on the document glass. By way of example, the document can be registered at registration zone 44. Also, the leading edge or the trailing edge of the document can be used as a reference edge.

A glass reference sensor (GRS) 46 is disposed off the exposure platen 12. The glass reference sensor 46 may be mounted on the frame of the document handler (not shown) or on the frame of the copier/duplicator. The sensor is mounted so that a document, which is transported by the vacuum transport belt past the glass reference position 14 to a point beyond the sensor, can be sensed. As a document is sensed, the sensor output level changes on conductor 48. The signal indicates the passage of a document. As will be explained subsequently, the signal on conductor 48 is utilized by the servo-controlled system means 30 to initiate an algorithm which drives the DC bidirectional motor so that the vacuum transport belt with an attached document can be positioned at registration zone 14, 44 or any other registration zone on the document platen. As can be seen from FIG. 1, the distance between the glass reference sensor 46 and the registration zone 14 on the document platen is identified as $T_O$. As before, the showing of $T_O$ as the distance between the GRS 46 and registration zone 14 should not be regarded as fixed since $T_O$ is a variable and changes as the registration zone changes.

Figure 5:
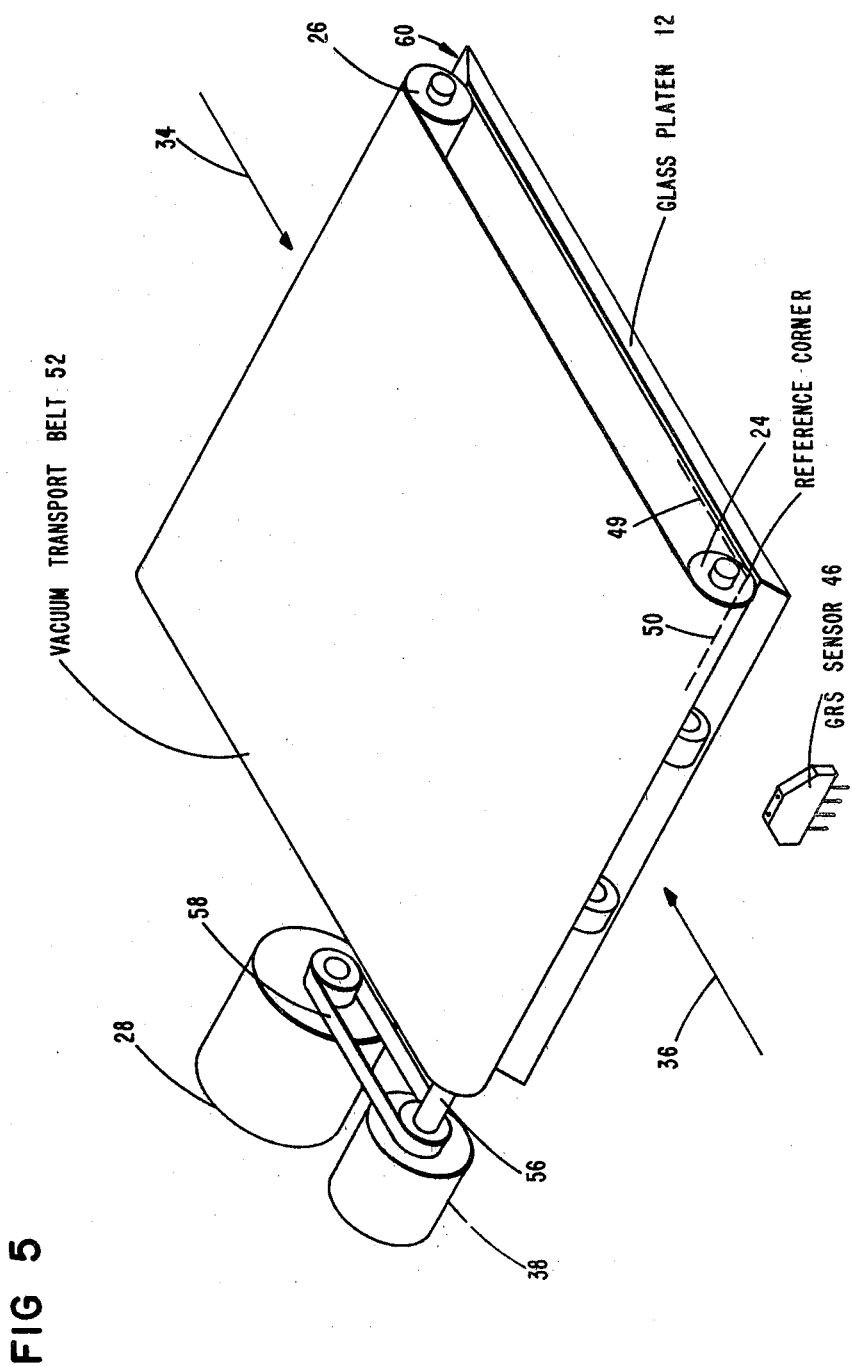
FIG. 5 shows a pictorial view of a vacuum transport belt which is the preferred sheet transport device.

Turning now to FIG. 5, a pictorial view of the vacuum transport is shown. Elements which are common to previously identified elements in FIG. 1 will be identified by the same numeral. The vacuum transport is disposed above the glass platen 12 of the convenience copier/duplicator. The registration position 49 and 50 identify the reference corner of the platen. As stated before, the invention allows the registration of a document (not shown) to be in alignment with the reference corner so that a image of the document can be projected onto the photoconductor surface of the copier/duplicator. The vacuum transport includes a vacuum transport belt 52. The belt is continuous and is mounted to drive roller 24 and idler roller 26. Forward direction of belt motion is identified by arrow 34. The reverse direction of the belt is identified by arrow 36. The drive roller 24 is fixedly mounted to shaft 56. A sensing means 38 is coupled to shaft 56. As stated previously, the sensing means 38 is a two-phased tachometer and outputs signals indicative of direction and position of the vacuum belt. A drive belt 58 couples the shaft 56 to bidirectional drive motor 28. When the motor is energized with the proper polarity, the belt is transported in the forward direction identified by arrow 34 or in the reverse direction identified by arrow 36. The GRS 46 which senses the passage of a sheet, is disposed downstream from the vacuum belt 52 in the direction of forward belt motion.

As was stated previously, the present invention is capable of registering a sheet at any point on the document platen of the convenience copier without the use of mechanical gates. The configuration of belt and sensors shown and described in FIGS. 1 and 5 above, are particularly adaptable for copying one side of a sheet. When one side of a sheet is copied, this is referred to as simplex copying. To this end, the sheet is fed by transport means 20 in the direction shown by arrow 22 onto the belt. The transport belt is driven by DC motor 28 and the leading edge of an attached sheet is driven past the glass reference position 14 beyond GRS 46 (FIG. 1) and then stopped. A control signal is generated by servo-control system means 30. The signal is outputted on conductor 32 and the belt moves in the opposite direction identified by arrow 36. As the belt begins to move to the right, that is in the direction identified by arrow 36, the servo-controlled system means 30 keeps check of the distance travelled by the belt. It should be noted that the edge of the sheet which was the leading edge when the belt was travelling in the direction shown by arrow 34, is now the trailing edge of the sheet when the belt changes direction of travel. As the trailing edge of the sheet clears sensor means 46, a signal is generated on conductor 48. This trailing edge signal is utilized by the servo control means to recalibrate servo control means and to generate the required dynamics for the belt so that the attached document is disposed in alignment with the registration zone on the platen. It should be noted that GRS 46 could be used to detect and position the leading edge of the document.

With reference to FIG. 5, the document would be attached at the lower surface of the belt at the position identified by numeral 60. The belt continues to move to the left in the direction shown by arrow 34, and when the leading edge of the attached document passes over GRS 46, the belt is stopped. The direction of belt motion is changed and the belt moves with the attached sheet in the direction shown by arrow 36. As before, as the trailing edge of the attached sheet clears the GRS 46, a timing sequence is initiated in the servo-controlled system means and a series of pulses are generated to accelerate and/or decelerate the vacuum belt system 52 so that the document is positioned at registration position 50.

Figure 8:
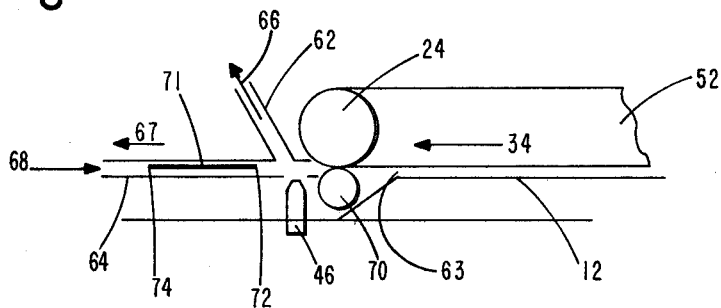
FIG. 8 shows an embodiment of the present invention where the glass reference sensor is mounted at the junction of the platen path, the simplex path, and the duplex path.

Referring now to FIG. 8, the glass reference sensor 46 is positioned at the confluence or junction of simplex path 64, duplex path 62 and platen path 63. Multiple paths may also occur at the junction where the paper paths of a semiautomatic document feeder (SADF) and an automatic document feeder (ADF) or a recirculating document feeder (RADF) intersect. As before, the transport belt 52 is mounted with drive roller 24 above the document exposure platen 12 of the convenience copier/duplicator. The forward direction of belt motion is from right to left in the direction shown by arrow 34. It should be noted that when a sheet is copied on one side only, the sheet is attached to the belt on the right side of FIG. 8 and transferred by the belt to the registration zone of the glass. After copying, the sheet is transferred in simplex path 64 in the direction of arrow 67 and is returned to the support tray (not shown) of the RADF. However, for duplex copying, the sheet is copied on both sides. To this end, after side one of the sheet is copied, it is driven in the direction of arrow 66 and it is returned in the direction of arrow 68, along duplex path 64 for copying of the second side. Back-up roller 70 assists the sheet in attaching to the vacuum belt as it is returned from the duplex path onto the belt.

As with the simplex copying previously described, in the duplex copying the trailing edge of the sheet is used to activate the servo-controlled system means 30 (FIG. 1) which initiates the control signals which control the belt to position the sheet at the proper registration zone on the document platen 12. By way of example, assuming that a document identified by numeral 71 is returned to the document platen for side two copying, the leading edge 72 of the document covers the sensor and the output signal from the sensor changes levels. However, the control system is conditioned so that the positioning algorithm is not initiated. As the trailing edge 74 of the document clears the sensor, again the GRS 46 state is changed. The signal generated by the trailing edge is a signal used to initiate the positioning algorithm function. It is therefore evident that whether it be simplex registration for one side copying or duplex registration for two side copying, the trailing edge of the document is used to initiate the position trajectory algorithm which is used to control the belt to eliminate sensor hysteresis so that the document is positioned at the proper registration zone. By using the trailing edge of the document, a single sensor is used for registering sheets on the document platen for simplex and/or duplex copying.

Figure 2:
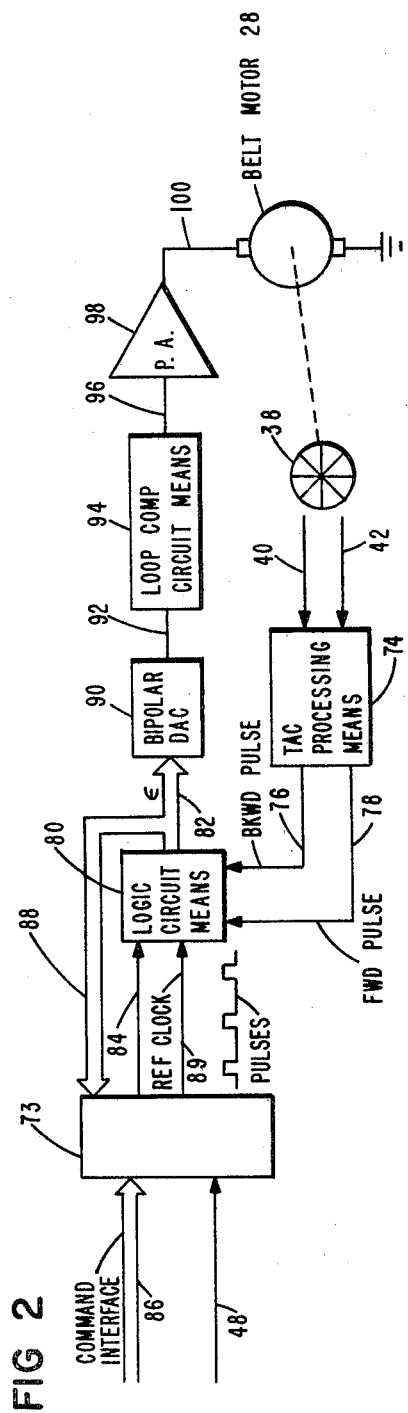
FIG. 2 shows, in block diagram form, the details of the servo-controlled system.

Referring now to FIG. 2, a block diagram of the servo-controlled system means 30 is shown. The function of the servo-control system means 30 is to generate control signals which force DC motor 28 to follow a particular position trajectory which transports the vacuum transport belt to position an attached document at a specific registration zone on the document platen 12 (FIG. 1). The servo-control system means 30 includes a closed loop servo system coupled to a controller 73. Although controller 73 may be configured from combinatorial logic circuit, in the preferred embodiment of this invention, the controller 73 is a conventional microcomputer. By way of example, the microcomputer may be the M6800 manufactured by Motorola Semiconductive Products, Inc. Of course, any other microcomputer can be used without departing from the scope of the present invention. Since microcomputers are well known in the art, details of the M6800 will not be given. Suffice it to say that the M6800 as well as all conventional microcomputers, include a set of instructions which can be used by people having ordinary skill in the programming art to generate the necessary electrical signals to accelerate and decelerate the belt so that the attached document will be placed at the registration zone.

Still referring to FIG. 2, as the belt motor 28 rotates clockwise or counterclockwise, the motion is monitored by the two-phase tachometer 38. Depending on the direction of the motor rotation, two sets of pulses are outputted on conductors 40 and 42, respectively. By way of example, if the motor rotates clockwise, the set of pulses outputted on conductor 40 lead those on conductor 42. If the motor rotates counterclockwise, the set of pulses on conductor 40 lag those on conductor 42. Of course, the designation of conductors transmitting lagging or leading pulses from the tach may be changed without departing from the scope of this present invention. The signals on conductors 40 and 42 are fed into tachometer (TAC) processing means 74. The tachometer processing means 74 includes combinational circuits which accept the pulses on conductors 40 and 42 and generate backward (BKWD) pulses on conductor 76 and forward (FWD) pulses on conductor 78. It should be noted that the backward pulse indicates that the motor is moving in one direction, say counterclockwise, while the forward pulse indicates that the motor is moving in the opposite direction, say clockwise. The use of combinational circuits for generating backward and forward pulse from a two-phase tach is well known in the prior art, and details of tach processing means 74 will not be given. By way of example, the tach processing means 74 may be of the type described in an article entitled "Logical Motion and Direction Detection" by H. C. Jackson in the *IBM Technical Disclosure Bulletin*, Volume 14, No. 12, May 1972 (pgs. 3672-3673). The forward and backward pulses on conductors 76 and 78, respectively, are fed into logic circuit means 80. The logic circuit means 80 comprises of logic circuits and counting circuits. In the preferred embodiment of this invention, the counting circuits include an up/down counter. The up/down counter accepts reference clock pulses 89 from microcomputer 73 and sums the reference clock pulses with the forward and/or backward pulses to generate servo error signal (called $\Sigma$) which is outputted on buss 82. The reference clock pulses 89 are a series of time-modulated pulses generated to obtain the desired position trajectory. The logic circuits of the logic circuit means 80 accepts directional signals from the microcomputer on simplex buss 84. The directional signal is generated by the microcomputer and instructs the circuitry to drive the belt right or left so that the sheet which is attached to the belt is positioned at the predetermined location on the document platen.

Command input to microprocessor 73 is supplied on command interface multiplexor buss 86. Information such as the direction of belt motion, that is right or left, and position whereat the sheet must be registered from the glass reference sensor (GRS) 46 (FIG. 1) is supplied on buss 86. There are a plurality of ways that can be used to present the command information on buss 86. By way of example, the command information such as position from the GRS sensor whereat the sheet must be registered, can be supplied from a bank of switches which would be attached to the instrument panel of the copier/duplicator. Alternately, the information can be supplied by microcode on buss 86 or from another microprocessor. Either the use of microcode or the use of switches are well within the skill of the art and, therefore, detailed implementation will not be described hereinafter.

The signal on conductor 48 is generated by the glass reference sensor and indicates to the microprocessor that an edge of the sheet has passed the glass reference sensor. As will be explained subsequently, this level change is utilized by the microprocessor to initiate a series of calculations which generate a position trajectory which forces the belt to position an attached sheet at the predetermined registration zone. In addition to the level change outputted from the GRS, the error signal outputted from logic circuit means 80 is fed over multiplexor buss 88 to the microcomputer 73. As will be described subsequently, the error signal on buss 88 is utilized in the algebraic calculation by the microcomputer. The error signal information is fed over buss 82 into bipolar digital-analog converter (DAC) 90. A bipolar DAC is necessary because the belt has to be moved bidirectionally. The DAC converts the digital signal into analog signal. The output of the DAC is coupled by conductor 92 into a loop compensation circuit means 94. The loop compensation circuit means 94 stabilizes the servo loop and prevents the same from oscillating. Loop compensation networks are well known in the art, and the detail will not be given. The output from the loop compensating network is fed over conductor 96 into power amplifier 98. The power amplifier amplifies the signal which it receives and drives belt motor 28 over conductor 100.

Before describing the series of process steps which must be followed in order to position a document at a registration zone on the document platen, the following variables will be defined. Each variable will be used in performing the necessary calculations needed in order to position the sheet at the predetermined registration zone.

(1) $T_O$ (FIG. 1) defines the distance that the registration zone is from the glass reference sensor. This distance can be defined by the number of tach pulses between GRS and the registration point.

(2) $\Sigma$ is the servo error generated as the difference between the feed-back pulses and the references (REF) clock pulses generated by the microcomputer (FIG. 2).

(3) $T_a$ represents the number of reference (REF) clock pulses generated to accelerate the belt from zero to its steady state (ss) velocity $V_o$, or to decelerate the belt from its ss velocity $V_o$ to zero. Each reference clock pulse generated by the computer 73 (FIG. 2) is equivalent to a tach pulse generated by tach 38.

(4) $R_o$ is the number of reference clock pulses that have been generated (distance) when the belt moves in a left to right direction from a point where the attached sheet covers the glass reference sensor until the trailing edge of the attached sheet clears the sensor.

(5) $M_o$ represents the midpoint distance whereat the belt must begin deceleration for the sheet to be aligned with the registration zone.

(6) A short move is defined as a move where the sheet is moved from a point over the glass reference sensor to its registration zone without the belt motor 28 reaching steady state velocity.

(7) A long move is defined as a move where the attached sheet is moved from a point covering the glass reference sensor to its registration zone on the glass platen with the motor reaching steady state velocity.

As was stated previously, this invention enables the electronic registration of the sheet at a particular registration zone on the copier platen so that side one (simplex registration) of the sheet can be copied and side two (duplex registration) of the sheet can be copied. To this end, and with reference to FIG. 1, it is assumed that the belt is moving right to left and accepts document 18 from transport means 20. The belt continues its motion and moves the sheet to the left. During motion, the belt is controlled by servo-control system means 30 so that the sheet is positioned at the predetermined registration zone.

Figure 3:
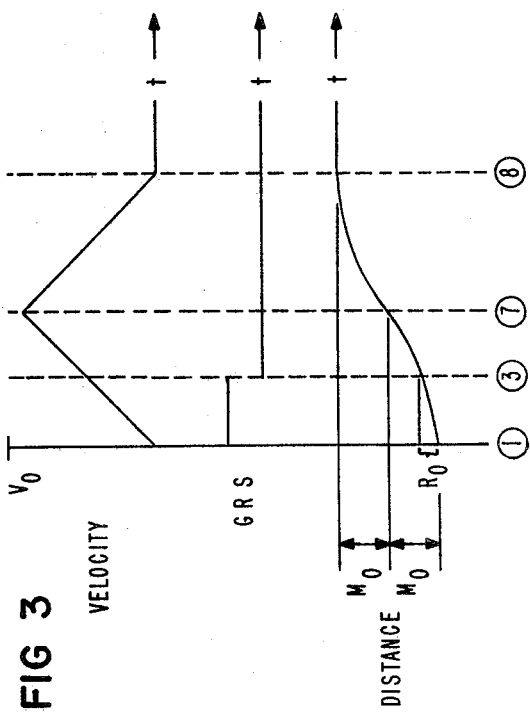
FIG. 3 shows the velocity and the distance profile of the document handling mechanism for a short move. The output signal from the sensor is also shown. The output signal initiates an algorithmic routine which results in the velocity/position control of the document handling apparatus.

FIG. 3 shows a timing diagram for a short move and will be used to explain the positioning of a sheet so that side one of the sheet is copied. Viewing the curves from top to bottom, the first curve represents a plot of belt velocity versus time. The second curve represents the change in signal level as the trailing edge of the sheet clears the glass reference sensor (GRS) relative to time. The signal is generated as the sheet travels from left to right. The third curve shows a plot of distance moved by the belt versus time. It should be noted that there is a relationship between the process step to be performed and the time when the step is performed. To this end common numerals are used to identify the process steps below and to identify the corresponding times on the timing diagram of FIG. 3. With reference to FIG. 1, it is assumed that the document to be registered is securely attached to the undersurface of the transport belt. It is also assumed that the direction of forward belt motion is identified by arrow 34. The direction of backward or reverse belt motion is identified by arrow 36. It is further assumed that the leading edge of the attached document extends beyond the GRS 46. It is assumed that the initial conditions are satisfied prior to the initiating of the following process steps:

Step 1: Upon command, accelerate the belt to the right and read in $T_O$ from the command interface 86 (FIG. 2).

Step 2: Count reference clock pulses ($R_O$) until glass reference sensor (GRS) clears.

Step 3: When GRS clears, read in servo error ($\Sigma$) and get $R_O$. It should be noted that when GRS is cleared the level signal outputted from the sensor changes (see FIG. 3).

Step 4: Determine that move is a short move. The move is short if $R_O+T_O+\Sigma$ is less than or equal to $2T_a$. As pointed out before by definition, $T_a$ is the distance moved by the belt from zero velocity until the motor reaches steady state. $R_O$ is obtained by interrogating the counter in microprocessor 73 (FIG. 2) which generates the reference clock pulses.

Step 5: Calculate the middistance ($M_O$) of move (see FIG. 3).

$(M_O=(R_O+T_O+\Sigma)$ divided by 2)

Step 6: Continue to accelerate the belt and count reference clock pulses.

Step 7: When the count of the reference pulses equals $M_O$, decelerate belt from a count of $M_O$ reference clock pulses to a count of 0.

Step 8: The belt velocity will be zero and the paper is now positioned correctly at the glass registration zone. The process is now completed for side one registration.

Figure 4:
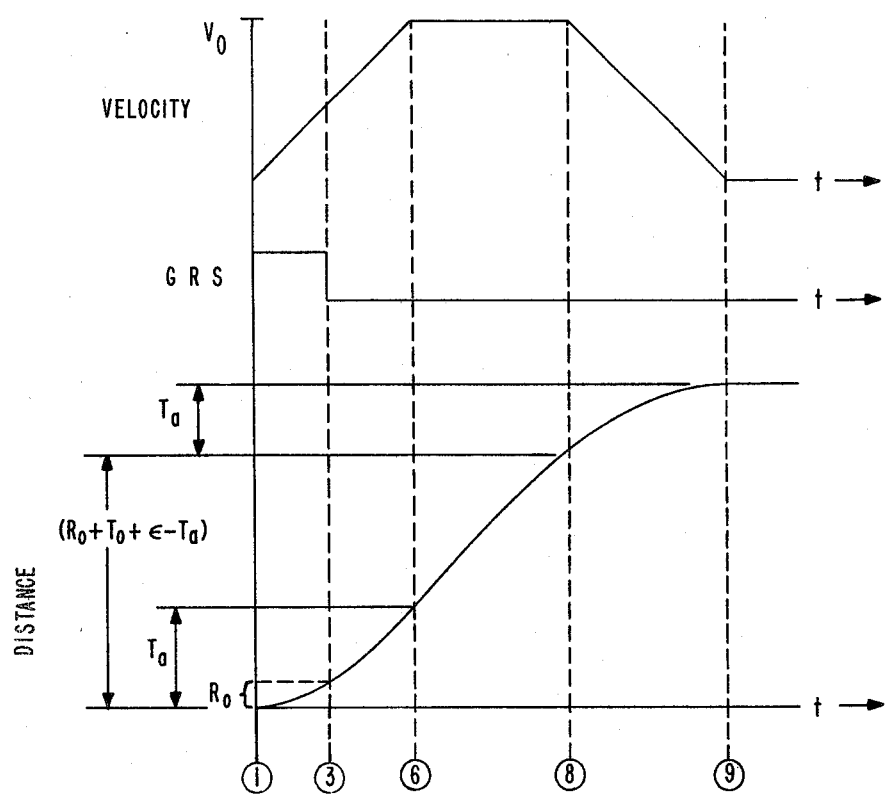
FIG. 4 shows the velocity and distance profile for a long move. The output signal from the sensor is also shown.

Referring now to FIG. 4, simplex (that is side one) registration of a sheet with a long move is shown. Identifying the curves from top to bottom, the first curve represents a plot of velocity versus time, the second curve represents the change in signal level outputted from the glass reference sensor (GRS) as a trailing edge of a sheet passes over said sensor. The third curve represents a distance versus time plot. As before, distance refers to the distance that the belt moves with the attached sheet. As was defined above, a long move refers to a move wherein the motor reaches steady state velocity. As before, the process steps for the long move will now be described. Numerals in the enunciated process step which correspond with particular times on the curves of FIG. 4 will be identified with the same numeral. By way of example, Step 1 below occurs at 1 (FIG. 4). Step 3 occurs at 3 (FIG. 4) and so on. Some of the steps below are calculations. As such, there is no corresponding numeral on the Figure.

Step 1: Upon command, accelerate the belt to the right and read in $T_O$ from the command interface 86 (FIG. 2).

Step 2: Count reference clock pulses ($R_O$) until GRS clears. As stated before, the reference clock pulses are generated by appropriate programming of the microcomputer 73.

Step 3: When GRS clears, read in the servo error $\Sigma$ and get $R_O$. As is identified by numeral 3 in FIG. 4, when GRS clears, a pulse is outputted from the sensor, that is there is a change in signal level.

Step 4: Determine that move is long (that is move distance larger than $2T_a$). Stated algebraically, $(R_O+T_O+\Sigma) > 2T_a$.

Step 5: Calculate $(R_O+T_O+\Sigma-T_a)$ to obtain belt decelerate count.

Step 6: Continue to accelerate belt until reference clock count equals $T_a$. At this point, switch belt to steady state velocity $V_O$.

Step 7: Continue to count reference clock pulses.

Step 8: When reference clock count equals $(R_O+T_O+\Sigma-T_a)$ decelerate belt for $T_a$ reference clock pulses to stop belt.

Step 9: Paper is now positioned correctly on glass.

Figure 9:
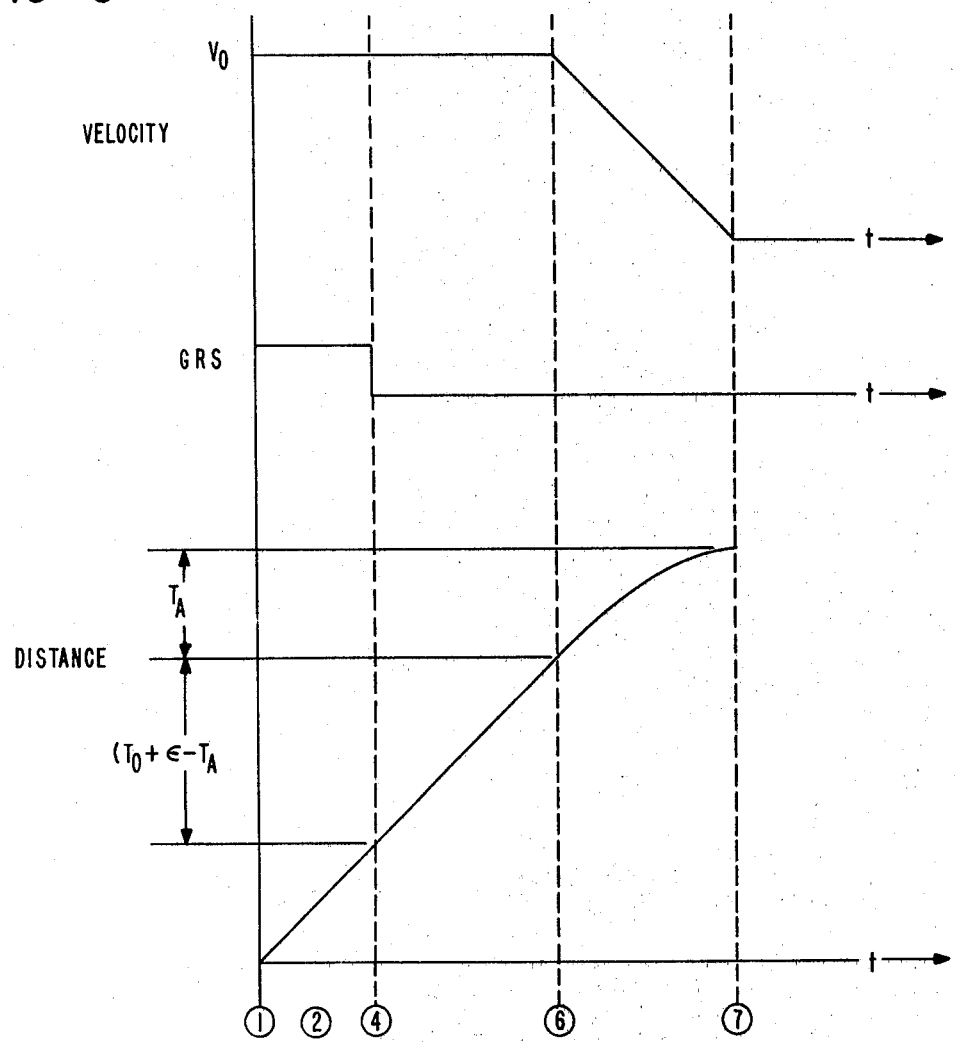
FIG. 9 shows the velocity and distance profiles for side two (duplex) registration.

Referring now to FIG. 9, a registration timing diagram for side two (that is duplex) copying of a document is shown. By way of example, and with reference to FIGS. 1 and 8, for side two copying it is assumed that the belt is in motion at steady state velocity from the left to right. In FIG. 9, the first curve, viewing from top to bottom, represents a velocity versus time plot. Curve two represents the point in time when the trailing edge of the attached sheet passes the GRS. The third curve represents a time distance plot. As before, process steps to be described which correspond with timing are identified by identical numerals. In order to register side two of the document, the following series of process steps must be performed.

Step 1: It is assumed that the belt is moving from left to right at steady state velocity ($V_O$) and has already accepted the document with side two facing the copy platen.

Step 2: Read in $T_O$ from the command interface.

Step 3: Look for GRS to clear. As is seen in FIG. 9, GRS clears when there is a change in the signal level outputted from glass reference sensor.

Step 4: When GRS clears, read in the servo error $\Sigma$ and start counting reference clock pulses.

Step 5: Calculate point where belt is to begin deceleration. The point where the belt is to be decelerated occurs when the reference clock count is equal to $T_O+\Sigma-T_a$.

Step 6: When reference clock count is equal to $T_O+\Sigma-T_a$ decelerate belt for $T_a$ reference clocks to stop belt.

Step 7: The paper is now positioned correctly on the glass.

Figure 6A:
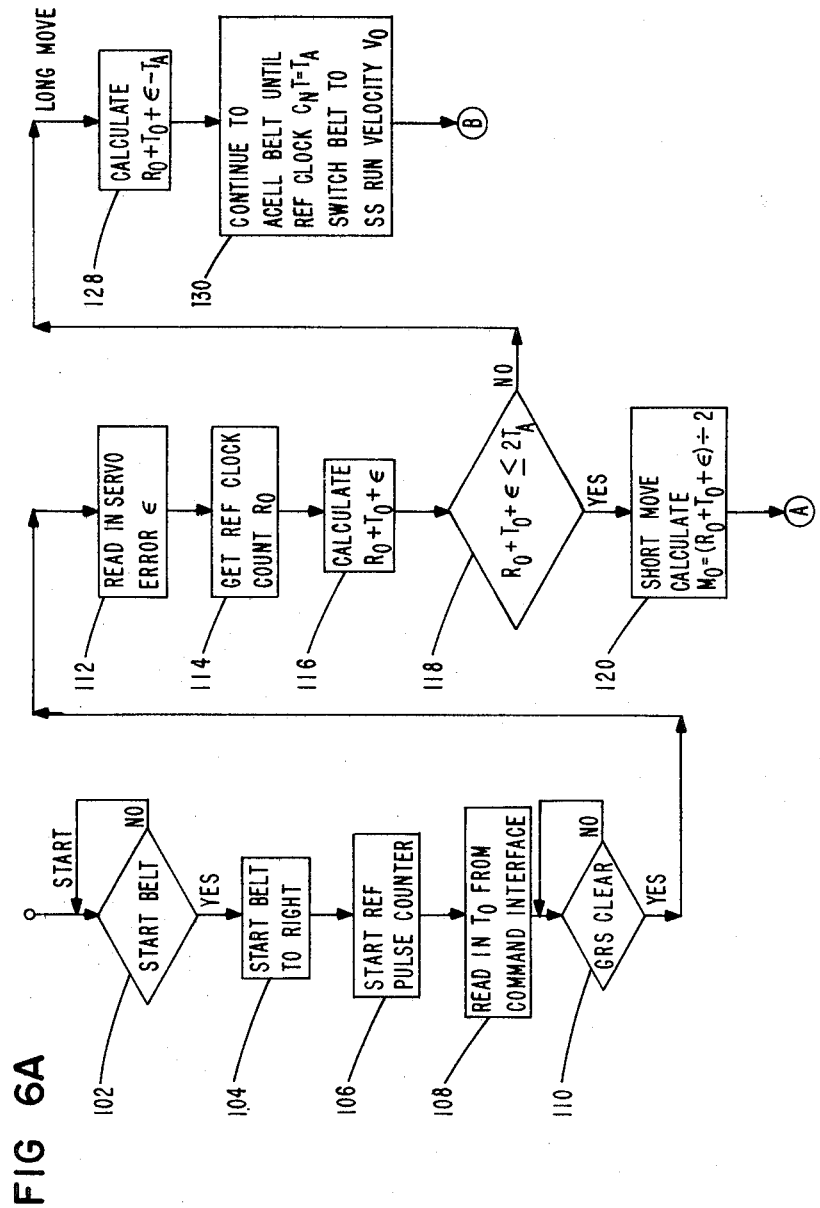
FIGS. 6A and 6B show a flowchart of the process steps used to program the controller to enable the copying of side one of a document (simplex copying).
Figure 6B:
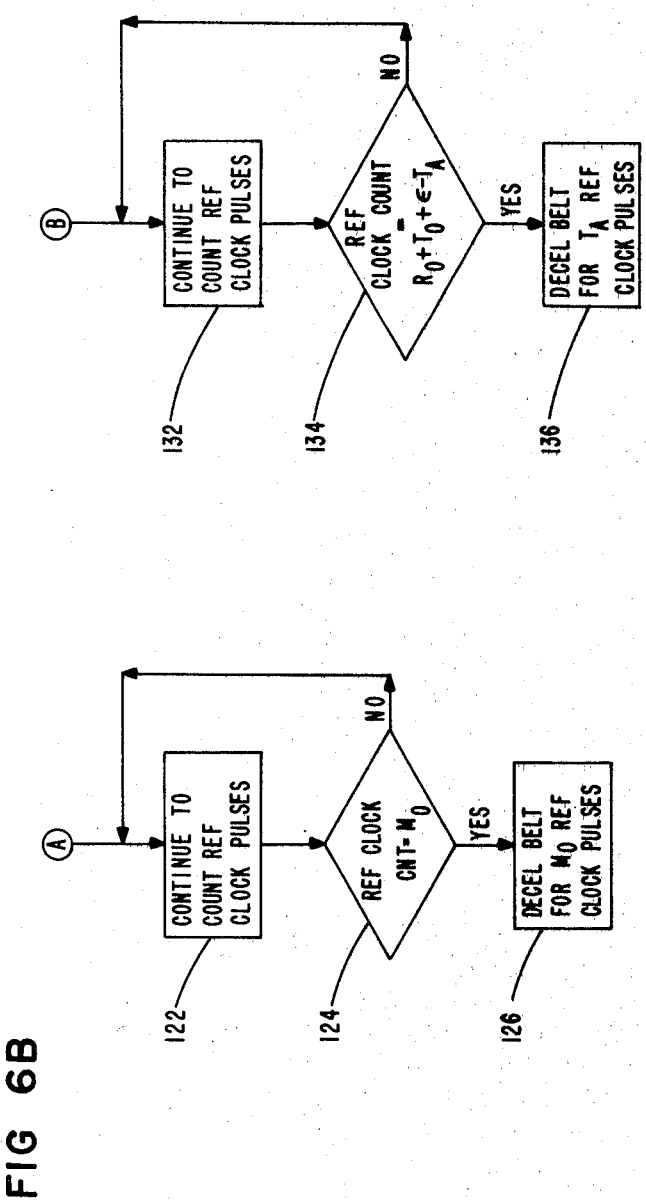

Having described the process steps, the hardware and the timing necessary to position a sheet at the registration zone on the exposure platen of a copier/duplicator so that a single side or both sides of the document can be copied, a series of process steps which will enable a skilled artisan to program the microcomputer 73 to perform the necessary calculations and generate the necessary reference clock pulse needed to drive the belt motor will now be described. FIGS. 6A and 6B show a flowchart of the process step used to program the microprocessor 73. Of course, it is within the skill of the art to utilize a plurality of different process steps without departing from the scope of the present invention. The first step in the flowchart is identified by decisional block 102. The function of the block is to indicate that computer 73 is looking for a start command at command interface 86. Once the start command is received, the program executes the start belt to the right routine identified by the functional block 104. Once the belt begins to move to the right, the program starts reference (REF) pulse counter identified by functional block 106. The reference pulse counter is a counter located in the microcomputer. With the reference pulse counter started, the program next reads in $T_O$ from the command interface. The read-in function is identified by functional block 108. Next the program enters decisional block 110. Decisional block 110 checks to see that the glass reference sensor (GRS) is clear. If the glass reference sensor is not clear, the program enters into a loop and continues to check until the sensor is cleared. Once the sensor is cleared, the program accesses the functional block 112. In functional block 112, the program reads in the servo error $\Sigma$ on multiplexor buss 82 (FIG. 2). The program then enters functional block 114. In functional block 114 the program obtains the count in the reference clock counter. The program then enters functional block 116 and calculates $R_O+T_O+\Sigma$. From functional block 116, the program enters decisional block 118. In decisional block 118 the program tests to see if $R_O+T_O+\Sigma$ is less than or equal to $2T_a$. As was stated previously, this test indicates if the move is a short move.

If the test is true (that is yes), the program enters functional block 120 and calculates $M_O$. As stated previously, $M_O$ is equal to $(R_O+T_O+\Sigma)\div 2$. The program next enters functional block 122 (FIG. 6B) and continues to count reference block pulses. From functional block 122, the program enters decisional block 124. In decisional block 124, the program tests to see if the reference clock count is equal to $M_O$. If the result is negative, the program enters into a loop and performs the function identified in block 122. If the result is positive, the program then performs the function identified in functional block 126 and the belt is stopped, positioning the paper at the desired registration zone.

If the test identified by decisional block 118 (FIG. 6A) is negative, the move is a long move. The program then enters and performs the function identified by functional block 128 (that is calculate $R_O + T_O + \Sigma - T_a$). Once the calculation is completed, the program performs the function identified by block 130, (i.e., continue to accelerate the belt until the reference clock count equals $T_a$). The belt is then switched to steady state run velocity $V_O$. From block 130, the program enters functional block 132 (FIG. 6B). In functional block 132, the program continues to count reference clock pulses. The program then enters decisional block 134. In decisional block 134, the program tests to see if the reference clock count is equal to $R_O + T_O + \Sigma - T_a$. If the result is negative, the program enters into a loop and will redo the function described in block 132. If the decision is positive, the program enters decisional block 136 and stops the belt positioning the attached document at the proper registration zone on the glass platen.

Figure 7:
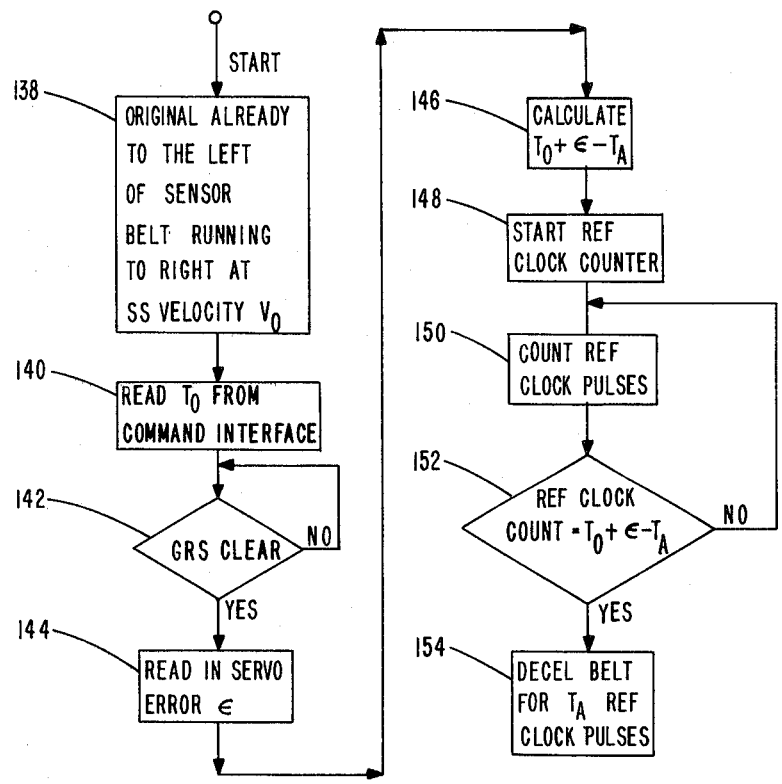
FIG. 7 shows a flowchart of the process steps used to program the controller to enable the copying of side two of the document (duplex copying).

FIG. 7 shows a flowchart which can be used to program the microprocessor so that side two of a document is registered for duplex copying. Block 138 is an entry block wherein some basic assumptions are being made. It is assumed that the original document is attached to the belt and covering the GRS sensor (FIG. 8). It is further assumed that the belt is running to the right with a steady state (ss) velocity $V_O$. The program then enters functional block 140. In functional block 140, the program reads $T_O$ from the command interface. The program then enters decisional block 142 and checks to see that the glass reference sensor is clear. If the sensor is not clear, the program enters into a loop. When the sensor is clear, the program enters functional block 144. In functional block 144, the program reads in the servo error $\Sigma$ from buss 88 (FIG. 2). The program then enters functional block 14 and calculates $T_O + \Sigma - T_a$. The program then enters functional block 148 where it starts the reference clock counter. The program next enters functional block 150 where it counts the reference clock pulses accumulated in the counter identified in step 148. The program then enters decisional block 152 and tests to see if the reference clock count is equal to $T_O + \Sigma - T_a$. If it is not, then the program enters a loop and continues until the reference count equals $T_O + \Sigma - T_a$. When this occurs, the program enters functional block 154, where it stops the belt and the document is now placed at the proper registration zone for duplex copying.

The above-described invention enables the use of an electronic gate for registering a document on the document platen of a copier for simplex or duplex copying. By using the above-described apparatus and method, damage to the edge of a document is eliminated.

A single sensor is used for simplex or duplex registration.

System throughput is increased since the frequency with which a document can be registered on the platen is increased.

A document can be registered at any point on the registration glass.

Although the above invention has been particularly shown and described with reference to a preferred embodiment thereof, it will be understood by those skilled in the art that various changes in form and details may be made therein without departing from the spirit and scope of the invention.

What is claimed is:

1. In a copier/duplicator having a frame with an exposure platen therein and a sheet handling apparatus mounted to said frame, said sheet feed apparatus being operable to place a document at a registration zone of the platen, the improvement comprising:
    a sensor means disposed at an off-platen location and operable to generate output signals representative of the passage of a document;
    means for generating a registration signal indicative of a zone whereat a document is to be registered on the platen;
    a means for transporting the document including the sheet handling apparatus, said means operable to transport the document in a first direction beyond the sensor means and in a second direction away from said sensor means;
    motor means operable to drive the sheet handling apparatus; and
    a controller means operable to utilize the registration signal and the output signal correlating with the trailing edge of the document and to output control signals for driving the motor so that the document is placed at the registration zone.

2. The improvement as set forth in claim 1 wherein the controller means includes a servo loop having a direction generating circuit coupled to the motor means and operable to generate positional pulses;
    a microcomputer for generating reference clock pulses and directional pulses; and
    a logic circuit/pulse counting means operable to combine the positional pulses with the reference clock pulses to generate error counts.

3. In a copier/duplicator system having a document feeder for moving documents along a first path for presentation to an exposure platen of the copier/duplicator for simplex and/or duplex copying, an output path for receiving documents that exit from the first path and a duplex path likewise positioned for receiving documents from the first path, and selectively operable means for directing documents into one of the output and duplex paths, an improved electronic registration gate comprising:
    a sensor means disposed within the vicinity of the confluence of the first path, the output path and the duplex path and positioned for producing a signal indicative of document movement relative to any of said paths at said confluence;
    a vacuum transport belt associated with the document handler and operable to position a document at a registration zone of said exposure platen;
    a bidirectional servo motor operable to move the vacuum transport belt so that a document is positioned at the registration zone; and
    a controller means operable to generate reference signals for driving the motor, said controller means conditioned to initiate a position control algorithm upon the occurrence of a signal from said sensor means signifying the passage of the trailing edge of the document moving from one of said output and duplex paths into the first path.

* * * * *